United States Patent
Daby et al.

(10) Patent No.: US 6,826,020 B2
(45) Date of Patent: Nov. 30, 2004

(54) MERGED-POLE MAGNETIC HEAD HAVING INVERTED WRITE ELEMENTS

(75) Inventors: Larry E. Daby, Erie, CO (US); Mark Lee Watson, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 537 days.

(21) Appl. No.: 09/933,996

(22) Filed: Aug. 20, 2001

(65) Prior Publication Data

US 2003/0035248 A1 Feb. 20, 2003

(51) Int. Cl.[7] .............................. G11B 5/39; G11B 5/265
(52) U.S. Cl. ...................................... 360/317; 360/316
(58) Field of Search ................................ 360/316, 317, 360/121, 126

(56) References Cited

U.S. PATENT DOCUMENTS

| | | | | |
|---|---|---|---|---|
| 5,541,793 A | * | 7/1996 | Schwarz | 360/121 |
| 5,963,400 A | * | 10/1999 | Cates et al. | 360/317 |
| 6,097,570 A | * | 8/2000 | Dee | 360/121 |
| 6,456,460 B1 | * | 9/2002 | Connolly et al. | 360/126 |
| 6,496,329 B2 | * | 12/2002 | Hungerford et al. | 360/121 |
| 6,542,321 B1 | * | 4/2003 | Molstad et al. | 360/31 |

FOREIGN PATENT DOCUMENTS

JP          11-31305        *  2/1999

* cited by examiner

*Primary Examiner*—David Ometz
(74) *Attorney, Agent, or Firm*—Brooks Kushman P.C.

(57) ABSTRACT

A two bump magnetic head for writing and reading information to a tape includes a merged-pole read/write element structure with inverted write elements. Each inverted write element includes top and bottom write poles. The write poles are fabricated such that the longitudinal dimension of the bottom write pole is smaller than the longitudinal dimension of the top write pole in a zero throat region. This results in an "inverted" structure. An upper portion of the bottom write pole is milled in at least the zero throat region early in fabrication to produce a precise width adjoining a write gap. The trimmed upper portion of bottom write pole results in an improved write geometry that produces tightly defined tracks.

4 Claims, 6 Drawing Sheets

MERGED-POLE MAGNETIC HEAD HAVING INVERTED WRITE ELEMENTS

BACKGROUND OF THE INVENTION

1. Field of the Invention

The present invention relates generally to thin film magnetic heads used to read and write information to a magnetic storage medium and, more particularly, to a merged-pole magnetic head having inverted write elements.

2. Background Art

Multi-channel magnetic heads are used in tape drives to read and write information to a magnetic tape while the tape travels in both directions relative to the head. Known head designs use thin film processes such as micro-lithography, evaporation, sputtering, ion milling, electroplating, and wet etching to produce magnetic micro-structures on one side of a substrate such as SiC, AlTiC, and ferrite. For example, a number of head architectures use thin film technology to pattern write and read elements onto a substrate, which are then subsequently machined into head bumps and glued together to align the write and read elements for bi-directional tape motion. FIG. 1 illustrates an example of a "two bump" magnetic head 10 formed in this manner, and FIG. 2 illustrates an example of a "three bump" magnetic head 20. An "R" is used to denote a read element, and a "W" is used to denote a write element, and respective gap lines are shown as dashed lines 12.

In order to write information onto a tape, read elements must be located so as to follow the track on the tape being recorded by the write elements. This is known as a read-back check and is used to ensure integrity of information written to the tape. Thus, write and read elements operate simultaneously. Unfortunately, the read channel detects unwanted noise from the write channel, which is commonly referred to as feed through. For this reason, write and read elements are kept separated from each other by a spacing denoted "d".

In addition to the spacing requirement, each read element (R) must be precisely aligned with a corresponding write element (W) as shown by the dashed line a—a, i.e., the "bump-to-bump" alignment. Proper alignment is essential in order to enable the head to be capable of "read-while-write" (RWW) operation to verify that the information has been written to the tape correctly as the tape is spooled through the head.

It is anticipated that future storage media such as tape will attain storage capacities in excess of 1 terabyte of information. Such a high storage capacity places significant demands on tape drives and will be achieved, in part, through a significant increase in track densities of the tape. This increase in track density means that not only will the multi-channel recording head have to write and read narrow track widths, but also that the servo system must correctly align the head relative to the tape during both read and write operations. This necessitates that the tape drive meet track mis-registration requirements, which includes, among other factors, the read and write width tolerances and head and tape dimension tolerances. As track densities are increased, all head designs require increasingly stringent alignment between the write and read elements in both the forward and reverse directions, i.e., the bump-to-bump alignment.

FIG. 3 illustrates a block diagram of a conventional two bump head 30 having a merged-pole read/write element structure. Head 30 meets some of the demands placed by increased track densities. Head 30 includes two modules 32 and 34 positioned back-to-back with respect to each other. Each module 32 and 34 includes a substrate 36 and a merged-pole read/write structure facing outwards. Each merged-pole read/write structure includes a read element 38 positioned on substrate 36 and a write element having a wide top write pole 40 and a bottom write pole 42. Wide top write pole 40 is used to write information to tape. In operation, information is written by top write pole 40 of module 32 and then read verified using read element 38 of module 34 in a first tape direction indicated in FIG. 3. Similarly, information is written by top write pole 40 of module 34 and then read verified using read element 38 of module 32 in the opposite tape direction.

A problem with conventional two-bump head 30 with its merged-pole read/write structure is that significant offset between the width of wide top write pole 40 and the width of the track of the tape occurs. This is exacerbated for narrow track widths and, depending on tape media type, substantial erased zones at each edge of the track are formed. Both of these factors can greatly limit the head width tolerance impacting the TMR budget.

SUMMARY OF THE INVENTION

Accordingly, it is an object of the present invention to provide a merged-pole magnetic head having inverted write elements.

It is another object of the present invention to provide a magnetic head having a merged-pole read/write element structure with inverted write elements.

It is a further object of the present invention to provide a merged-pole multiple bump magnetic head having inverted write elements.

It is still another object of the present invention to provide a merged-pole magnetic head having write elements in which an inverted pole is used to write information.

In carrying out the above objects and other objects, the present invention provides a magnetic head for writing and reading data on a tape. The magnetic head includes first and second substrates each having first and second surfaces. The first surfaces of each substrate being connected with each other, the second surfaces of each substrate having a read element and an inverted write element. Each read element being formed over the second surface of each substrate and each inverted write element is formed over a respective read element.

Each inverted write element includes a write gap in a zero throat region and a top write pole disposed adjoining the write gap in the zero throat region. The top write pole has a top write pole width in the zero throat region. A bottom write pole is disposed adjoining the write gap in the zero throat region on a side of the write gap opposite the top write pole. The bottom write pole has an upper portion adjoining the write gap and a lower portion. The upper portion having an upper portion width in the zero throat region. The lower portion having a lower portion width in the zero throat region. The lower portion width being greater than the upper portion width and smaller than the top write pole width.

The write gap has a write gap thickness and the upper portion of the bottom write pole has an upper portion thickness. The write gap and the upper portion of the bottom write pole may be arranged so that the upper portion thickness is at least twice the write gap thickness.

Each inverted write element may further include a base disposed adjacent the bottom write pole on a side opposite the write gap, and a planarization layer disposed between the base and the write gap. Each inverted write element may further include a coil disposed adjoining the write gap on a same side of the write gap as the top write pole.

Further, in carrying out the above objects and other objects, the present invention provides a method of fabricating a magnetic head. The method includes forming a read element on a first surface of respective first and second substrates. A bottom write pole is then formed over each read element. Each bottom write pole has an upper portion and a lower portion in a zero throat region. A write gap is then formed overlaying each bottom write pole and a top write pole is formed overlaying each write gap. Each top write pole has a top pole width in the zero throat region that is greater than the lower portion width of the respective bottom write pole. Second surfaces of the first and second substrates together are then connected together.

Forming each bottom write pole may include depositing a bottom write pole layer, patterning the bottom write pole layer to define the upper portion of the bottom write pole disposed on a remainder layer, and patterning the remainder layer to define the lower portion of the bottom write pole.

Alternatively, forming each bottom write pole may includes depositing a bottom write pole layer, patterning the bottom write pole layer to define an intermediate bottom write pole, and patterning the intermediate bottom write pole to define the upper portion and the lower portion of the bottom write pole.

The method may further include depositing a planarization layer overlaying the bottom write pole prior to forming the write gap, and lapping the planarization layer to expose the upper portion of the bottom write pole in response to depositing the planarization layer. In this case, forming each bottom write pole includes forming an upper portion thickness to a target value and the method may further include lapping the planarization layer and the bottom write pole to reduce the upper portion thickness to a final value in response to lapping the planarization layer to expose the upper portion of the bottom write pole.

The method may also include measuring the upper portion width of the bottom write pole in the zero throat region to produce an actual upper portion width prior to forming the write gap, and stopping fabrication in response to the actual upper portion width being out of tolerance.

The above objects and other objects, features, and advantages of the present invention are readily apparent from the following detailed description when taken in connection with the accompanying drawings.

DETAILED DESCRIPTION OF THE PREFERRED EMBODIMENT(S)

Several terms are used in this document in a generic sense. The term "forming" is meant to include any combination of fabrication steps that result in the deposition and patterning of a layer. This includes depositing a layer followed by a subsequent patterning using a masking layer to control the removal of unwanted material. It also includes the deposition of a patterning mask layer used to control a subsequent deposition. The term "deposition" is any method of creating a layer of material over an existing surface. Deposition includes sputtering, evaporation, chemical vapor deposition, plating, and other like methods known in the art. The term "patterning" is any method of defining a geometric area or areas where a layer will and will not exist, or will exist in a thinner form. Patterning includes wet chemical etching, electromechanical machining, lift off techniques, ion milling, focused ion beams and other like methods used in the art.

Figure 1:
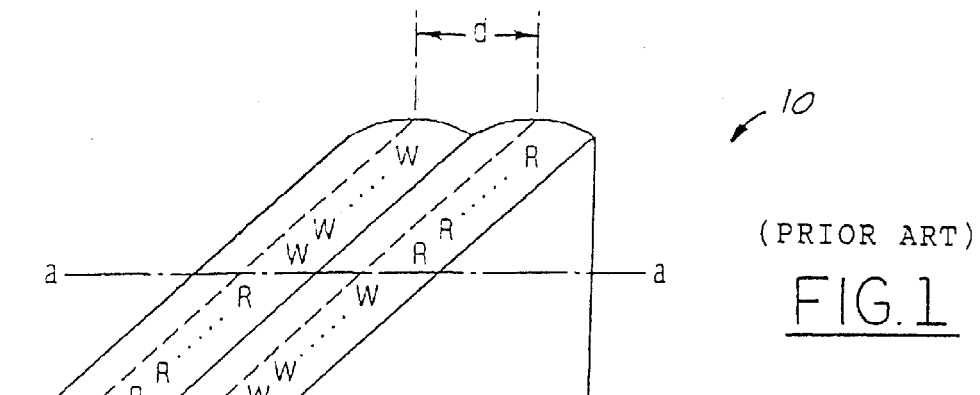
FIGS. 1 and 2 illustrate elevated perspective views of conventional two bump and three bump magnetic heads.
Figure 2:
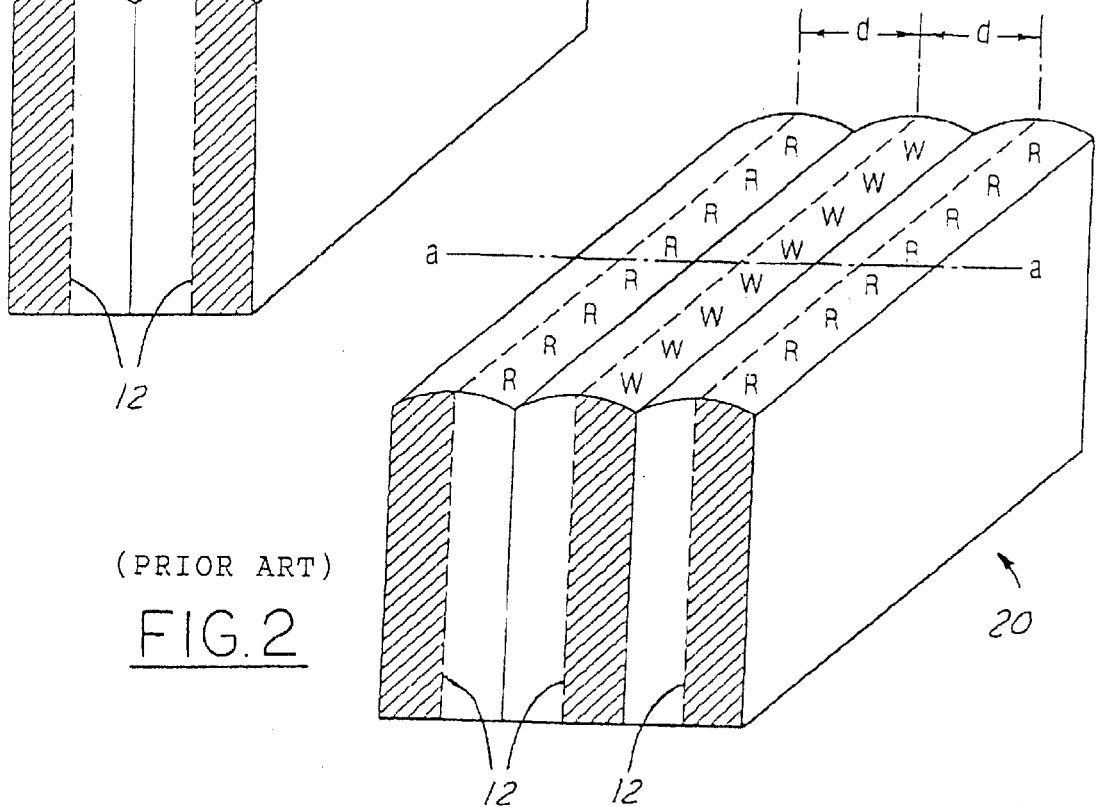
Figure 3:
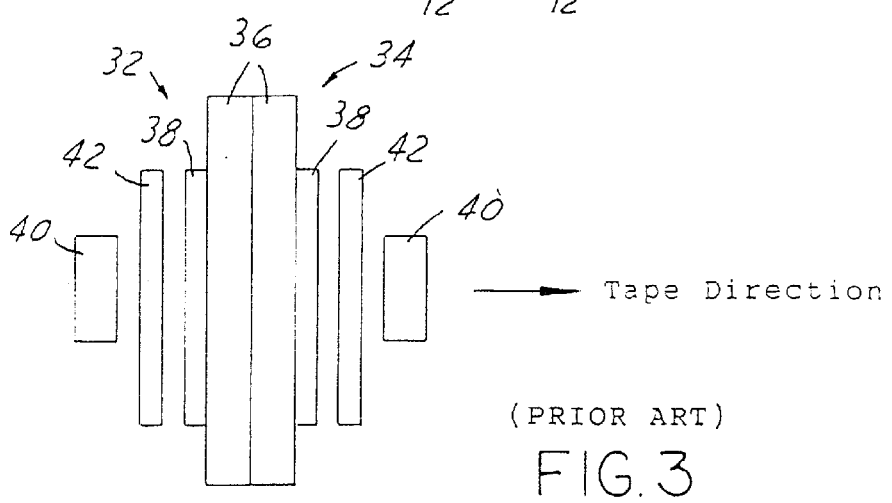
FIG. 3 illustrates a block diagram of a conventional two bump magnetic head having a merged-pole read/write element structure.
Figure 4:
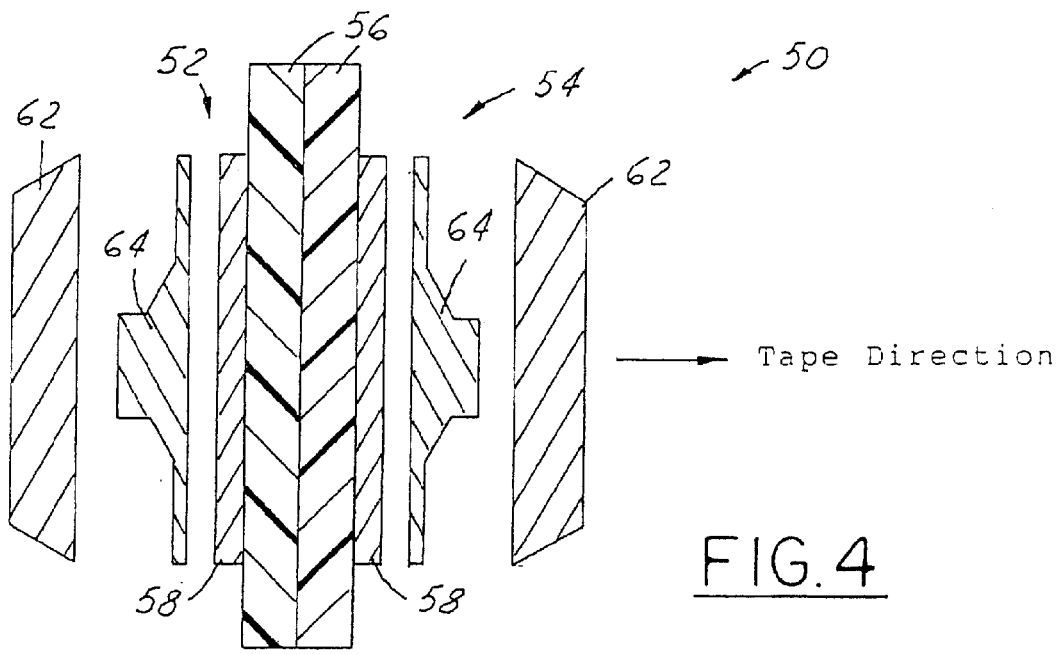
FIG. 4 illustrates a block diagram of a two bump magnetic head having a merged-pole read/write element structure with inverted write elements in accordance with the present invention.
Figure 5:
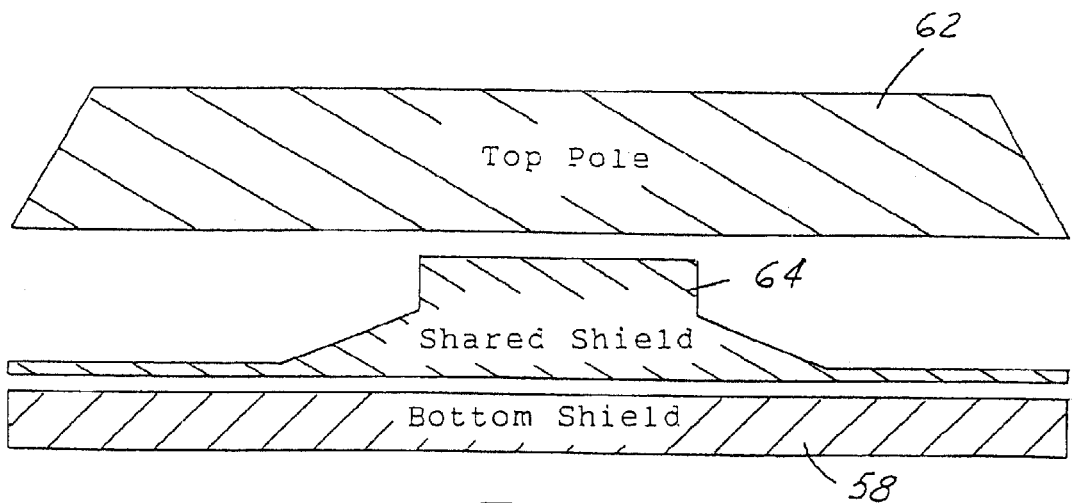
FIG. 5 illustrates an enlarged view of the merged-pole read/write structure of the head shown in FIG. 4 in accordance with the present invention.
Figure 6:
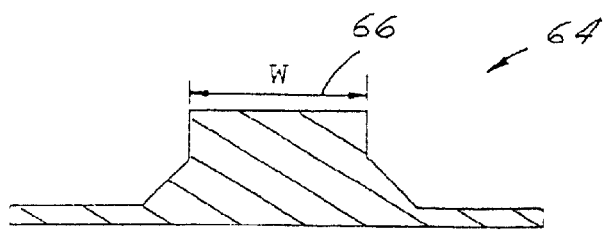
FIG. 6 illustrates an enlarged view of the inverted bottom write pole of the merged-pole read/write structure shown in FIG. 5 in accordance with the present invention.

Referring now to FIG. 4, a block diagram of a two bump magnetic head 50 in accordance with the present invention is shown. Head 50 includes two modules 52 and 54 positioned back-to-back with respect to each other. Each module 52 and 54 includes a substrate 56 and a merged-pole read/write structure facing outwards. As best shown in FIG. 5, each merged-pole read/write structure includes a read element 58 (bottom shield) positioned on substrate 56 and an inverted write element. Inverted write element includes a top write pole 62 an inverted bottom write pole 64 (shared shield). Inverted bottom write pole 64 is used to write information to tape. As best shown in FIG. 6, inverted bottom write pole 64 has a narrow pole tip width "W" indicated by 66 which defines the written track width. Because the narrow pole tip of inverted bottom write pole 64 is used to write information to tape the control of the write width and track edge erase zones provided by merged-pole head 50 is significantly improved as compared to conventional merged-pole head 30.

In operation, information is written by inverted bottom write pole 64 of module 52 and then read verified using read element 58 of module 54 in a first tape direction indicated in FIG. 4. Similarly, information is written by inverted bottom write pole 64 of module 54 and then read verified using read element 58 of module 52 in the opposite tape direction.

The fabrication of head 50 in accordance with the present invention is generally as follows. Bottom write pole 64 is deposited to the desired thickness. Bottom write pole 64 is then patterned using conventional photo-resist patterning and film definition processes such that the bottom write pole is formed to be inverted with an inverted pole width 66. The write element is then finished using a typical write element process with the exception that top write pole 62 is patterned such that it is wider than inverted bottom write pole 64. This process may be implemented in thin film write elements using both single and stacked coil designs with several different inverted pole widths. This process enables the inverted pole width to be accurately controlled both over a substrate and between substrate lots.

In essence, top write pole 62 and bottom write pole 64 are fabricated where the longitudinal dimension of the bottom write pole is smaller than the longitudinal dimension of the top write pole in a zero throat region. This results in an "inverted" structure. An upper portion of bottom write pole 64 is ion milled in at least the zero throat region early in fabrication to produce a precise width adjoining a write gap. The trimmed upper portion of bottom write pole 64 results in an improved write geometry that produces tightly defined tracks.

Figure 7:
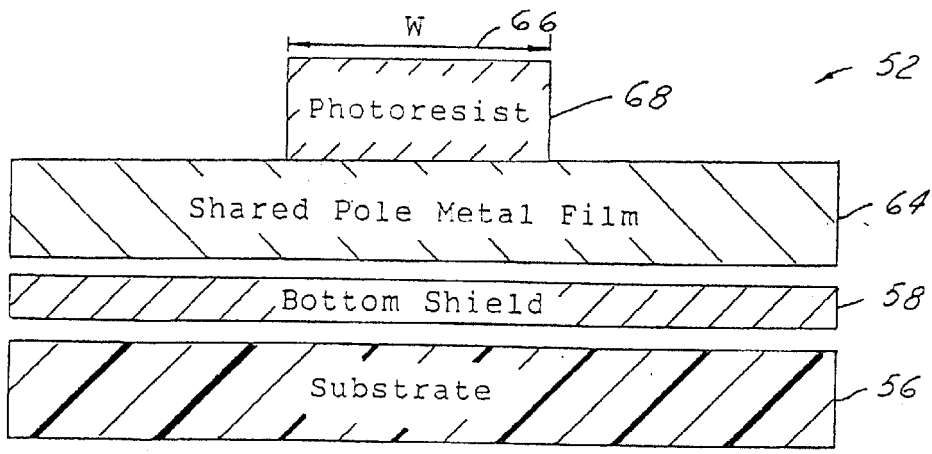
FIGS. 7, 8, 9, and 10 illustrate the general description of the fabrication process of the magnetic head in accordance with the present invention.
Figure 8:
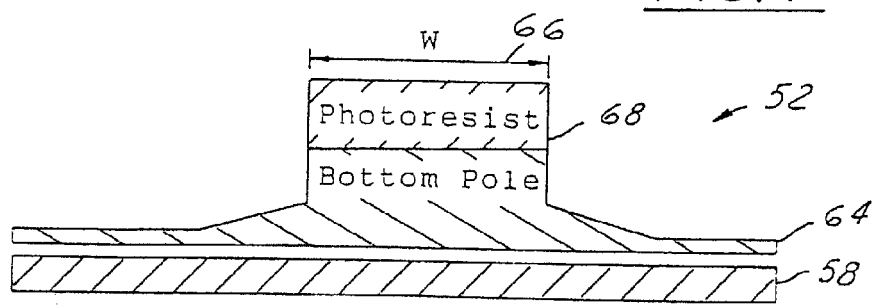
Figure 9:
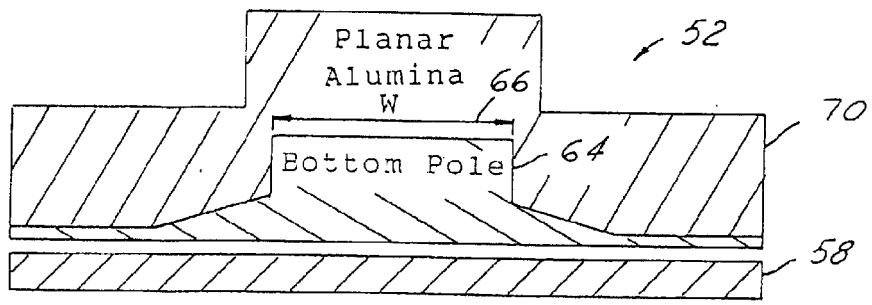
Figure 10:
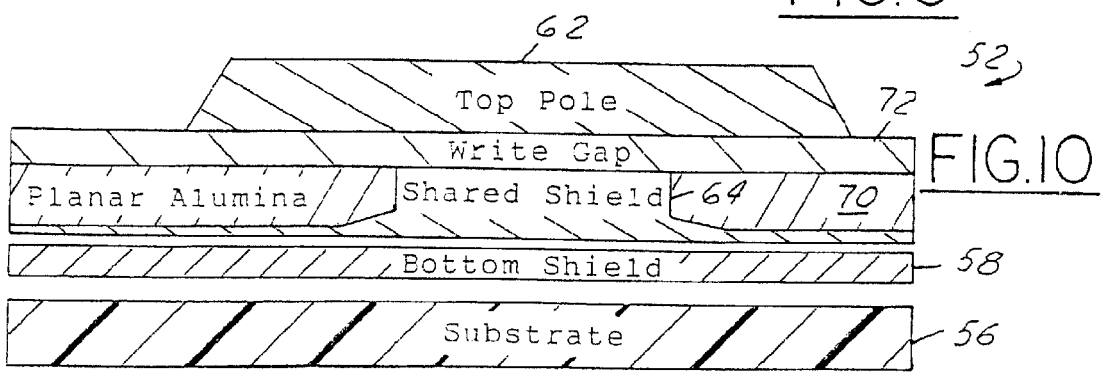

Referring now to FIGS. 7, 8, 9, and 10, the general description of the fabrication process of head 50 in accordance with the present invention will be described in more detail. Initially, as shown in FIG. 7, read element 58 (bottom shield) is placed over substrate 56. Bottom write pole 64 (shared pole metal film) is positioned over read element 58. A photo-resist layer 68 having width 66 is then patterned on bottom write pole 64. As shown in FIG. 8, the inverted pattern of bottom write pole 64 is ion milled and, as shown in FIG. 9, the perimeter shapes are etched and planar alumina 70 is deposited over inverted bottom write pole 64. As shown in FIG. 10, the surface of planar alumina and inverted bottom write pole 64 is chemically and mechanically polished flat and top write pole 62 is formed over the inverted bottom write pole. Top write pole 62 and inverted bottom write pole 64 are separated by a write gap 72.

Figure 11A:
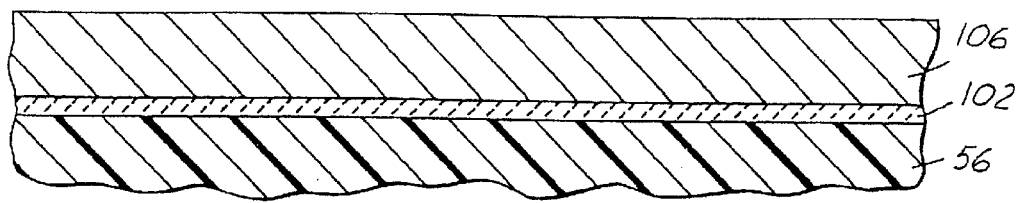
FIGS. 11A, 11B, and 11C illustrate a first sequence of fabrication steps for forming the magnetic head in accordance with the present invention.
Figure 11B:
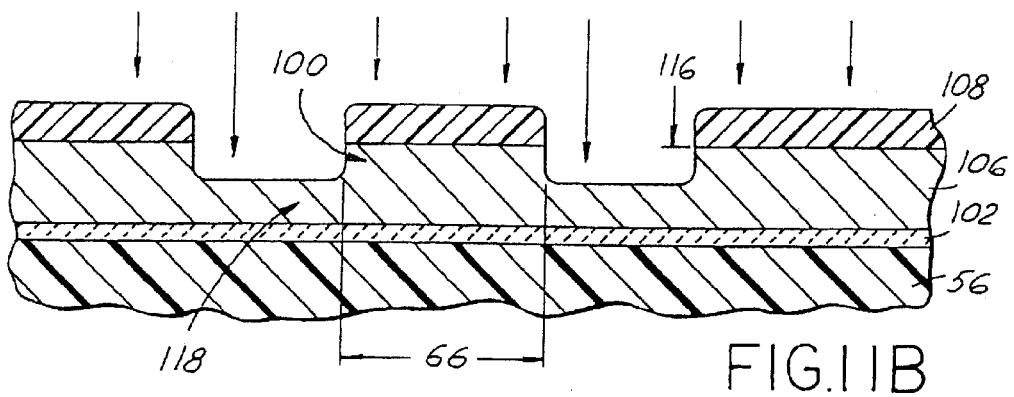
Figure 11C:
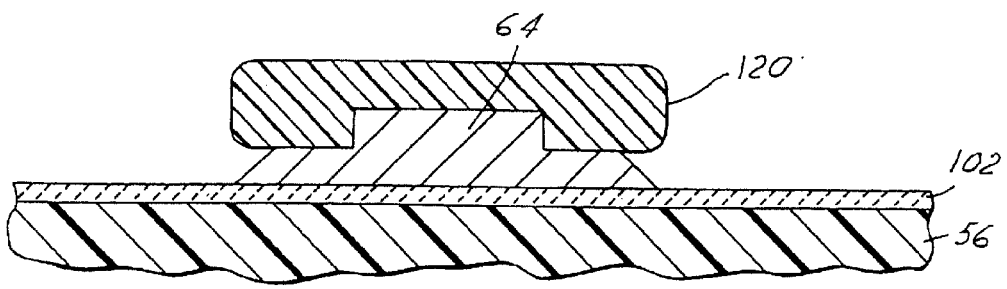

Referring now to FIGS. 11A, 11B, and 11C, a more detailed description of the fabrication process of head 50 in accordance with the present invention will now be described. In the interest of simplicity, read element 58 (bottom shield) will be omitted from the remaining figures illustrating the fabrication process of head 50. It is to be understood that read element 58 is initially formed over substrate 56 and separated from the substrate by an electrically insulating layer. Another electrically insulating layer 102 is formed over read element 58.

A lapping strap seed layer (not shown) is then formed on substrate 56 to produce resistive elements. The lapping strap seed layer is used later in the fabrication process to monitor the progress of a final lapping step. Bottom write pole 64 is then formed following the formation of the lapping strap seed layer. Bottom write pole 64 is started by depositing a bottom write pole layer 106 of magnetic material overlaying undercoat layer 102. Preferably, deposition is by vacuum deposition followed by an annealing. A preferred material for bottom write pole layer 106 is a cobalt zirconium tantalum alloy deposited to a thickness of approximately three to five micrometers. Various nickle iron alloys, such as 45:55 NiFe and 50:50 NiFe, iron nitride alloys, and nickle iron nitride alloys may also be used in place of the CZT layer.

Referring now to FIG. 11B, a photo-resist mask 108 is deposited, exposed, and developed overlaying bottom write pole layer 106. Ion milling is then performed using photo-resist mask 108 to shield areas of bottom write pole layer 106 that are not to be milled. In particular, an upper portion 110 in what will be part of a zero throat region 112 (see FIG. 15) of the magnetic transducer is protected by photo-resist mask 108 from milling. This upper portion 110 has an upper region width in a longitudinal direction, as indicated by arrow 66, that will ultimately control the track width on the tape. Ion milling is performed to produce an upper portion thickness, as indicated by arrow 116, having a target value. A remainder layer 118 of bottom write pole layer 106 is left unmilled around upper portion 110. After ion milling, photo-resist mask 108 is stripped.

Figure 12:
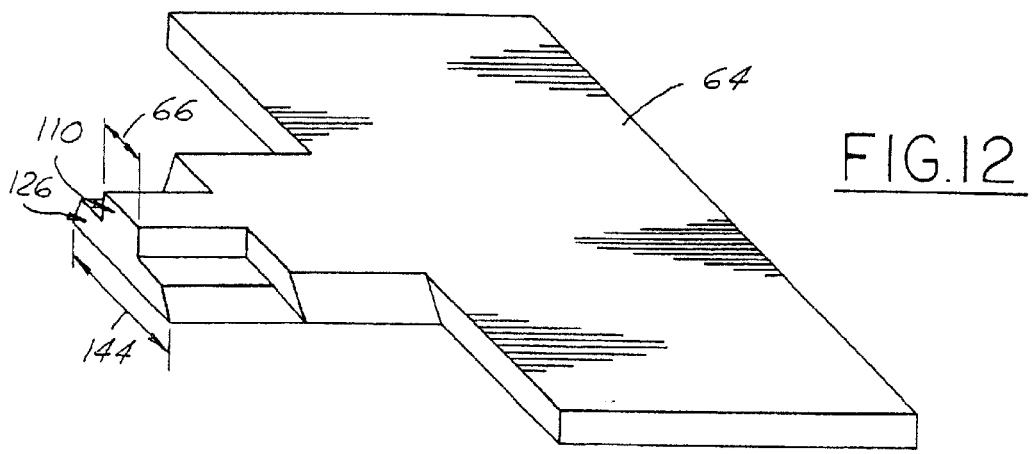
FIG. 12 illustrates a perspective view of the bottom write pole.

Referring now to FIG. 11C, a second photo-resist mask 120 is deposited, exposed and developed overlaying bottom write pole layer 106. Second photo-resist mask 120 covers upper portion 110 and slightly overlaps remainder layer 118 immediately adjoining the upper portion. An etch is them performed through second photo-resist mask 120 to remove unwanted areas of remainder layer 118. This leaves each bottom write pole 64 isolated from its neighbors. After the second photo-resist mask 120 is stripped, the resulting bottom write pole 64 appears as shown in FIG. 12.

Alternatively, the ion milling may be performed around the entire perimeter of bottom write pole 64, instead of just in zero throat region 112. Furthermore, the ion milling shown in FIG. 11B may be continued until the entire thickness of bottom write pole layer 106 is milled. This makes the second photo-resist mask 120 and subsequent etching step shown in FIG. 11C unnecessary.

Figure 13A:
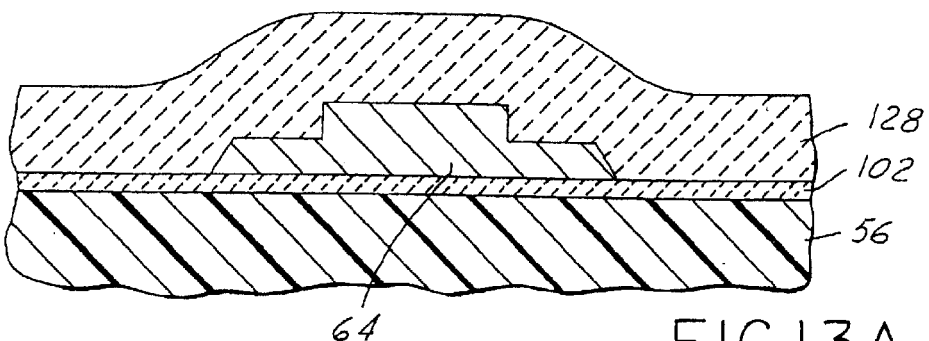
FIGS. 13A, 13B, and 13C illustrate a second sequence of steps for forming a planarization layer for the magnetic head in accordance with the present invention.
Figure 13B:
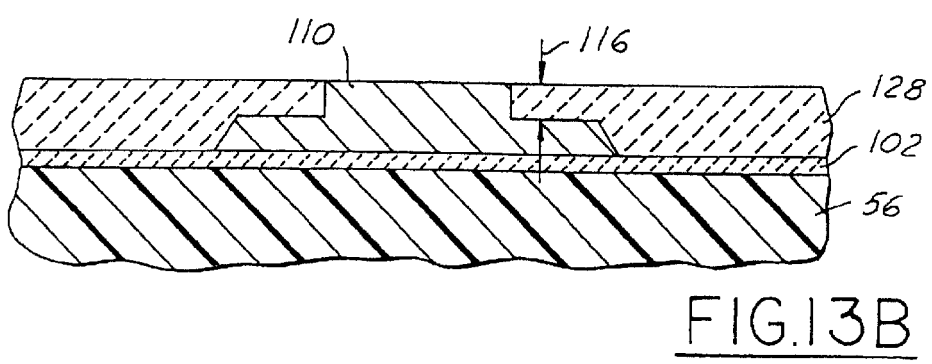
Figure 13C:
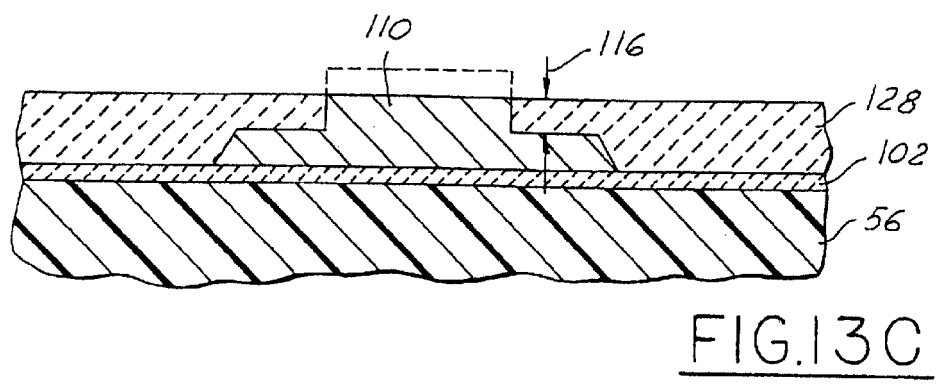

Referring now to FIG. 13A, a planarization layer 128 is deposited overlaying bottom write pole 64. Planarization layer 128 is made of alumina, although other nonmagnetic electrically isolating materials could be used. Planarization layer 128 is then lapped using a chemical mechanical polishing or other compatible process to expose upper portion 110 as shown in FIG. 13B. At this point all of planarization layer 128 should be removed from immediately above bottom write pole 64. However, due to variations in processing and material thickness at various points on the wafer, some planarization layer 128 may remain overlaying some of bottom write pole 64. To ensure that bottom write pole 64 are exposed, lapping is continued to remove a small amount of the bottom write poles as shown by the phantom line in FIG. 13C. This produces a proper surface to form write gap 72.

Initially, upper portion 110 of bottom write pole 64 is milled to the upper portion thickness 116 having the target value. Lapping reduces upper portion thickness 116 to a final value. Ideally, upper portion thickness 116 should be at least twice as large as the thickness of write gap 72. This allows upper portion 110 of bottom write pole 64 to dominate the write track width characteristics of the magnetic transducer. If upper portion thickness 116 were significantly smaller than twice the thickness of write gap 72 then magnetic fringe fields associated with lower portion 118 of bottom write pole 64 would help widen the track width written in the tape.

At this point in the fabrication process, upper portion width 66 is measured to determine if the actual upper portion width is in compliance with a predetermined dimension and tolerance. The predetermined dimension for upper portion width 66 is generally on the order of less than twenty micrometers. Tolerance for the predetermined dimension may be less than one-half micrometer when ion milling is used to form upper portion 110. Where the actual upper portion width is found in tolerance, then the fabrication process continues. Where the actual upper portion width is found out of tolerance, then the fabrication process is stopped. Here, bottom write poles 64 and planarization layer 128 are stripped and the process started over. This process allows errors in upper portion width 66 to be detected early in the fabrication cycle thus reducing wasted costs associated with completing the fabrication steps before the error is found.

Figure 14:
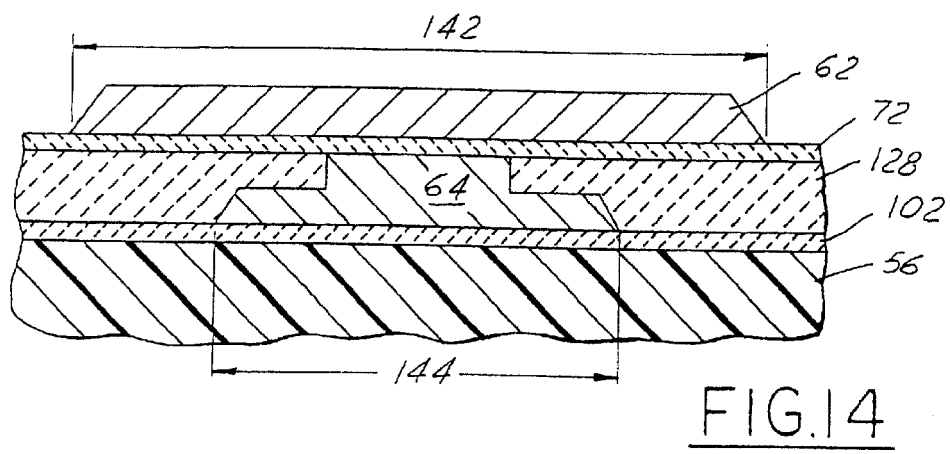
FIG. 14 illustrates a profile of the top write pole and the bottom write pole of the magnetic head in accordance with the present invention as seen from the tape media bearing surface.
Figure 15:
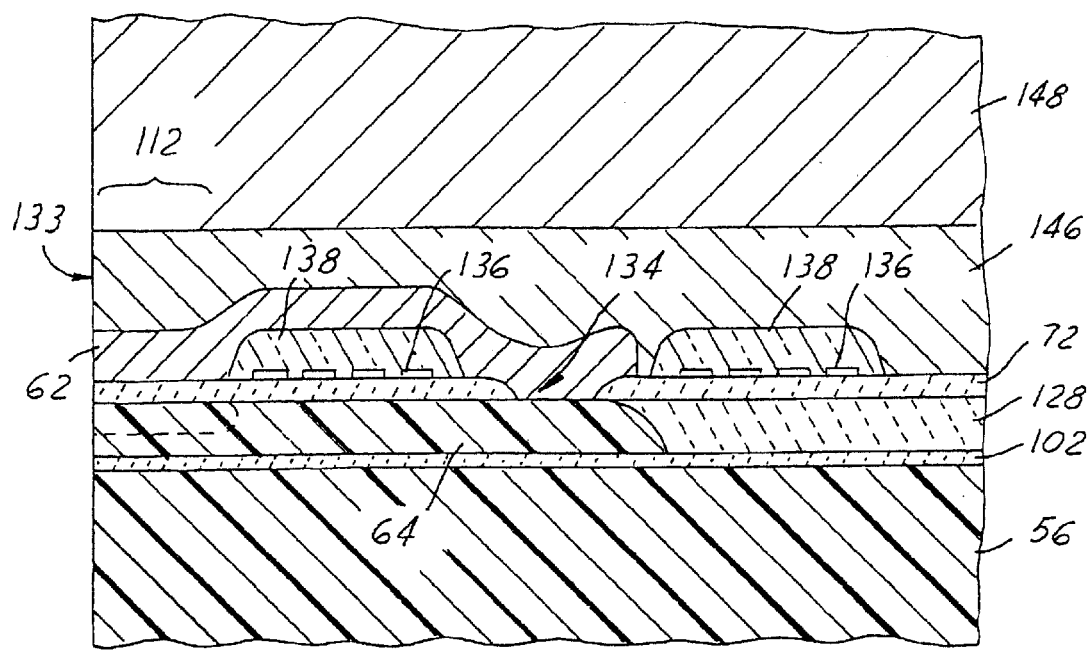
FIG. 15 illustrates a profile of the inverted read/write structure of the magnetic head in accordance with the present invention.

Referring now to FIGS. 14 and 15, write gap 72 is deposited overlaying bottom write pole 64 and planarization layer 128. Write gap 72 is typically, but not necessarily, a sputtered alumina material deposited to a thickness of approximately 0.65 micrometers. Write gap 72 forms a write gap or break in the magnetic yoke formed by bottom write pole 64 and top write pole 62. A write signal induced in the magnetic yoke generates fringe magnetic fields across write gap 72 at a media bearing surface 133. (The media bearing surface 133 is commonly called an air bearing surface in hard disk applications, and a tape bearing surface in magnetic tape applications.) These fringe magnetic fields write data to a tape. Write gap 72 is patterned to open a back gap via 134 that allows top write pole 62 to connect with bottom write pole 64 completing the magnetic yoke structure.

A coil 136 is then formed on write gap 72. Most of coil 136 is then covered by a coil insulating layer 138. Coil insulating layer 138 is patterned so as not to cover write gap 72 in zero throat region 112, the back gap via 134 where top write pole 62 and bottom write pole 64 connect, and the ends of coil 136. Coil insulating layer 138 provides electrical isolation between individual windings of coil 136 and top write pole 62. Electrical isolation between coil 136 and bottom write pole 64 is provided by write gap 72. Coil 136 is made of copper plated in the presence of a photo-resist mask (not shown). Other electrical conductors such as gold, and other deposition and patterning methods may also be used to form coil 136. An insulating layer may be deposited on write gap 72 and patterned prior to forming coil 136. This insulating layer provides an enhanced level of electrical isolation between coil 136 and bottom write pole 64.

Next, another cleaning is performed to insure write gap 72 in zero throat region 112 is clear of any residue from the previous process steps. This cleaning is followed by a deposition of top write pole 62. Top write pole 62 is usually, though not necessarily, the same magnetic material as used to form bottom write pole 64. Top write pole 62 is a layer of CZT deposited by sputtering to a thickness of approximately three to five micrometers.

A photo-resist mask (not shown) is then deposited, exposed, and developed over top write pole 62. This photo-resist mask is used to define the shape of top write pole 62 during a subsequent etch. The resulting top write pole 62 has a top pole width, as indicated by line 142, that is greater than a lower portion width of bottom write pole 64, as indicated by line 144, that in turn is greater than width 66 of upper portion 110 of the bottom write pole. This gives the magnetic transducer the appearance of having inverted poles where the smaller of the two poles is between the larger pole and substrate 56. One advantage of fabricating a wide top write pole 62 is that the top pole layer can be deposited to a smaller thickness than traditionally narrow top poles. This is because the magnetic flux at top write pole 62 is spread out over a larger area longitudinally thus reducing the probability of saturating the magnetic material in any given region.

Various deposition and patterning processes may be used to create the top write pole 62. For example, sputtering, evaporation, chemical vapor deposition and other deposition process known in the art may be used to establish top write pole 62. Patterning methods such as lift off, focused ion beam milling and other patterning methods known in the art may be used to define top write pole 62.

When formation of top write pole 62 has been completed, an overcoat layer 146 is deposited to a thickness ranging between ten and fifty micrometers, as shown in FIG. 15. Overcoat layer 146 is typically made of alumina material. After deposition, overcoat layer 146 is lapped flat to prepare the uppermost surface for formation of bonding pads (not shown).

Each magnetic write transducer on substrate 56 is then electrically tested to identify operational and non-operational transducers. Next, individual transducers or arrays of transducers, depending upon the desired configuration, are cut from substrate 56. For magnetic tape applications, the transducers are then mounted with a top closure 148. Finally, the media bearing surface 133 is lapped to produce a finished surface. During this final lapping step, the resistance of the resistive elements formed in the lapping strap seed layer are monitored to determine how far the lapping has encroached on zero throat region 112.

The process described above may also be used to fabricate a combined thin film magnetic read-write transducer where the read element is a magneto-resistive film or a giant magneto-resistive film. Magneto-resistive film and giant magneto-resistive film magnetic read transducer structures normally consist of a magnetically sensitive film disposed between insulating layers that in turn are flanked by magnetic shields. The process for fabrication a combined thin film magnetic read-write transducer begins with the process for fabricating the magnetic read transducer and then transitions into the magnetic write transducer process. It is common for the insulating layer and shield layer above the magnetically sensitive film to double as base layer 102 and bottom write pole 64 of the magnetic write transducer.

Finally, two substrates 56 with completed merged-pole read/write structures having inverted read elements are connected back-to-back as shown in FIG. 4 to complete the fabrication of head 50. The write element of each merged-pole read/write structure has a top write pole 62 which is wider than bottom write pole 64, and the bottom write pole has an even narrower upper portion 110 of width 66 adjoining write gap 72 that controls the track width.

Thus it is apparent that there has been provided, in accordance with the present invention, a merged-pole magnetic head having inverted write elements that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A magnetic head for writing and reading data on a tape, the magnetic head comprising:
   first and second substrates each having first and second surfaces, the first surfaces of each substrate being connected with each other, the second surfaces of each substrate having a read element and an inverted write element, wherein each read element is formed over the second surface of each substrate and each inverted write element is formed over a respective read element;
   wherein each inverted write element includes:
   a write gap in a zero throat region;
   a top write pole disposed adjoining the write gap in the zero throat region, the top write pole having a top write pole width in the zero throat region; and
   a bottom write pole disposed adjoining the write gap in the zero throat region on a side of the write gap opposite the top write pole, the bottom write pole having an upper portion adjoining the write gap and a lower portion, the upper portion having an upper portion width in the zero throat region, the lower portion having a lower portion width in the zero throat region, the lower portion width being greater than the upper portion width and smaller than the top write pole width.

2. The magnetic head of claim 1 wherein:

the write gap has a write gap thickness and the upper portion of the bottom write pole has an upper portion thickness, the write gap and the upper portion of the bottom write pole being arranged so that the upper portion thickness is at least twice the write gap thickness.

3. The magnetic head of claim 1 wherein:

each inverted write element further includes a base disposed adjacent the bottom write pole on a side opposite the write gap, and a planarization layer disposed between the base and the write gap.

4. The magnetic head of claim 3 wherein:

each inverted write element further includes a coil disposed adjoining the write gap on a same side of the write gap as the top write pole.

\* \* \* \* \*